3,391,174
NOVEL PROCESS FOR PREPARING BIS(TRI-ORGANOTIN)SULFATES AND BIS(TRIOR-GANOTIN)SULFITES

Anatole Wowk, Rahway, N.J., assignor to M & T Chemicals Inc., New York, N.Y., a corporation of Delaware
No Drawing. Filed Feb. 16, 1965, Ser. No. 433,173
19 Claims. (Cl. 260—429.7)

ABSTRACT OF THE DISCLOSURE

In accordance with certain of its aspects, the process of this invention for preparing a product selected from the group consisting of bis(triorganotin)sulfates and bis(triorganotin)sulfites comprises reacting in the presence of water a triorganotin oxide with an inorganic metal salt selected from the group consisting of alkali metal hydrogen sulfates and alkali metal hydrogen sulfites thereby forming said product, and recovering said product.

---

This invention relates to a novel process for preparing organotin compounds, particularly triorganotin sulfates and sulfites. It will be apparent to those skilled-in-the-art that these compounds are also known as bis(triorganotin) sulfates and bis(triorganotin)sulfites.

Triorganotin sulfates and sulfites are compounds which are useful as active agents in biological compositions such as fungistatic, bacteriostatic, anifouling, nematocidal, miticidal, insecticidal, etc. compositions. They may also be employed as stabilizers for polymers such as rubber, polyvinyl chloride, polyvinylidene chloride, etc. However, no completely satisfactory process for preparing these compounds has heretofore been known. Prior art techniques have required the use of such reactants as sulfuric acid or sulfur trioxide. These materials are extremely reactive and corrosive. They typically cause loss of product by charring or other decomposition and they are difficult and dangerous to handle.

It is an object of this invention to provide a novel process for preparing triorganotin sulfates and sulfites in high yield. Other objects will be apparent to those skilled-in-the-art upon reading the following description.

In accordance with certain of its aspects, the process of this invention for preparing a product selected from the group consisting of triorganotin sulfates and triorganotin sulfites comprises reacting in the presence of water a triorganotin oxide with an inorganic metal salt selected from the group consisting of alkali metal hydrogen sulfates and alkali metal hydrogen sulfites thereby forming said product, and recovering said product.

The products of this invention are triorganotin sulfates and triorganotin sulfites. Typically, these compounds may be those having the formula $(R_3Sn)_2SO_a$ wherein R is selected from the group consisting of alkyl, aryl and alkenyl; and $a$ is 3–4. When $a$ is 3, the product will be a triorganotin sulfite, and when $a$ is 4, the product will be a triorganotin sulfate.

The triorganotin oxides which may be employed in this invention are those having three organic groups bonded to tin through carbon. Typically the organic groups bonded to tin may be selected from the group consisting of alkyl, aryl, and alkenyl. The triorganotin oxide of this invention may be in the form of a bis-triorganotin)oxide, $(R_3Sn)_2O$ or a triorganotin hydroxide, $R_3SnOH$. As is known to those skilled in the art, these two forms of the triorganotin oxide may exist in equilibrium and either form may predominate, depending upon the particular conditions.

In the triorganotin oxide, R may be selected from the group consisting of alkyl, aryl, and alkenyl. For example, R may be alkyl, including methyl, ethyl, n-propyl, isopropyl, n-butyl, isobutyl, sec-butyl, tert-butyl, n-amyl, neopentyl, isoamyl, n-hexyl, isohexyl, heptyl, octyl, decyl, dodecyl, tetradecyl, octadecyl, cyclopentyl, cyclohexyl, cycloheptyl, cyclooctyl, etc. R may be aryl, including phenyl, naphthyl, anthryl, phenanthryl, etc. R may be alkenyl, including allyl, 1-propenyl, methallyl, buten-2-yl, buten-3-yl, penten-1-yl, hexenyl, heptenyl, octenyl, decenyl, dodecenyl, tetradecenyl, octadecenyl, etc. R may be an inertly substituted radical of the type hereinbefore described.

Typical inert substituents which may be present include alkyl, aryl, cycloalkyl, aralkyl, alkaryl, alkenyl, ether, halogen, etc. Typical substituted alkyls include trichloromethyl, 3-chloropropyl, 2-ethoxyethyl, β-cyanoethyl, benzyl, 4-methylcyclohexyl, 4-chlorocyclohexyl, β-phenylethyl, etc. Typical inertly substituted aryls include chlorophenyl, biphenyl, anisyl, tolyl, xylyl, p-nonylphenyl, p-styryl, etc. Typical substituted alkenyls include 4-chloro-2-butenyl, chloroallyl, 4-phenyl-3-butenyl. All of the R groups need not be the same. Preferably, R may be phenyl or lower alkyl, i.e., alkyl containing less than about 10 carbon atoms.

Preferred triorganotin oxides which may be employed include trimethyltin hydroxide, triethyltin hydroxide, bis(triethyltin)oxide, tri-n-propyltin hydroxide, bis(triisopropyltin)oxide, bis(tri-n-butyltin)oxide, triphenyltin hydroxide, bis(triphenyltin)oxide, tricyclohexyltin hydroxide, bis(tricyclohexyltin)oxide, etc.

The triorganotin oxide may be reacted with an inorganic metal salt selected from the group consisting of alkali metal hydrogen sulfates and alkali metal hydrogen sulfites, also commonly identified as alkali metal bisulfates and alkali metal bisulfites. The term "alkali metal" will be understood to include ammonium. Typically, the inorganic metal salt may have the formula $MHSO_a$ wherein M is alkali metal, including ammonium, and $a$ is 3–4. Preferably, M may be sodium, potassium and ammonium. Illustrative compounds which may be employed include sodium hydrogen sulfate, lithium hydrogen sulfate, potassium hydrogen sulfate, ammonium hydrogen sulfate, sodium hydrogen sulfite, lithium hydrogen sulfite, potassium hydrogen sulfite, ammonium hydrogen sulfite, etc. The inorganic metal salt may be added in the anhydrous form or as a hydrate, typically a monohydrate. It may be added as such or prepared in situ, e.g., by the addition of a metabisulfite to water, by the addition of corresponding acid, say sulfuric acid, and a base containing the alkali metal, say sodium hydroxide, sodium carbonate, etc.

Preferably, the triorganotin oxide and the inorganic metal salt may be reacted in the presence of water. The amount of water present is preferably at least one mole per mole of inorganic metal salt, i.e. an amount corresponding to the inorganic metal salt monohydrate.

Most preferably, the inorganic metal salt may be employed in the form of an aqueous solution thereof. Typically, the aqueous solution may contain from 10% by weight to saturation and preferably 25–55%, say 35% by weight of the inorganic metal salt. In accordance with certain preferred aspects of this invention, the aqueous solution may contain the minimum quantity of water necessary to dissolve the inorganic metal salt. Where the inorganic metal salt is used in the form of a hydrate, the amount of additional water employed may be correspondingly reduced.

Reaction of the triorganotin oxide and the inorganic metal salt may be effected by mixing them together in the presence of the desired amount of water and maintaining them in intimate contact until the reaction is complete. Contact of the reactants may be enhanced by dissolving the organotin oxide in a suitable inert organic solvent and employing the preferred aqueous solutions of inorganic metal salt. The inert organic solvent may be one which is miscible or immiscible with water. It may be a hydrocarbon, such as toluene, xylene, benzene, hexane, heptane, petroleum ether, etc; an alcohol, such as methanol, ethanol, n-propanol, isopropanol, n-butanol, sec-butanol, isobutanol, etc.; an ether, such as ethyl ether, isopropyl ether, butyl ether, tetrahydrofuran, etc. Other inert organic solvents may be used. Preferably, the inert organic solvent may be employed in the amount of about 100–800 parts by weight, say 150–500 parts by weight per 100 parts by weight of triorganotin oxide.

The process of this invention may be represented by the general reaction Equations I and II wherein R and $a$ are as hereinbefore defined.

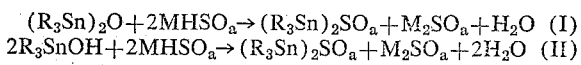

In accordance with certain preferred aspects of the invention, the process of this invention may be represented by Equations III and IV.

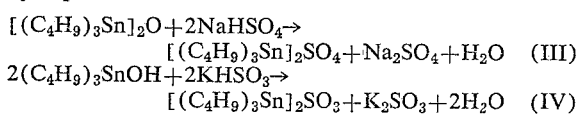

The process of this invention may be highly efficient and the quantities of the two reactants employed may be essentially stoichiometric according to reactions I and II, i.e., the amount of $MHSO_a$ employed may be about 2 moles per mole of bis(triorganotin)oxide. When the corresponding triorganotin hydroxide is used, it will be understood that two moles of triorganotin hydroxide are equivalent to one mole of bis(triorganotin)oxide. A small excess of either reactant, say up to about 10% excess, may be employed, if desired. Preferably a small excess, and most preferably about a 1–5% excess, of the inorganic metal salt may be used.

The reactants may be mixed together at the beginning of the reaction, or one reactant may be added to the other. Incremental addition may be employed. The reaction temperature may typically be about 20–100° C. and preferably about 40–85° C. The reaction mixture may preferably be maintained at the desired temperature, with good agitation, for sufficient time to allow the reaction to go to completion, typically for about 0.1–3 hours and preferably for about 0.5–2 hours.

At the end of the reaction period, the mixture may be cooled, and the product triorganotin sulfate or triorganotin sulfite may be recovered. Depending upon the nature of the organic groups bonded to tin, the product may be a liquid, a solid, etc. Where the product $(R_3Sn)_2SO_a$ is soluble in the inert organic solvent, it may be physically separated from the by-product $M_2SO_a$, which does not have any substantial solubility in the organic solvent. After physical separation, the organic solvent may be stripped off, preferably under vacuum, to give the desired product. Where both $(R_3Sn)_2SO_a$ and $M_2SO_a$ are insoluble in the reaction mixture, they may be filtered off together, and the $M_2SO_a$ may be extracted from the desired product with water. Residual unreacted organotin oxide may be removed by extraction with a suitable solvent, say hexane, acetone or isopropyl alcohol. If desired, the product may be recrystallized from acetone, isopropyl alcohol, 1,2-dimethoxyethane or from other suitable solvent.

It is a feature of this invention that the desired products are obtained in high yield and high purity and handling of corrosive reactants is avoided.

Practice of specific embodiments of this invention may be observed from the following illustrative examples wherein all parts are parts by weight unless otherwise specified.

Example 1.—Bis(tri-n-butyltin)sulfate

A solution of 276 parts (2 moles) of sodium bisulfate monohydrate ($NaHSO_4 \cdot H_2O$) in 500 parts of water may be added, with stirring, to a solution of 596 parts (1 mole) of bis(tri-n-butyltin)oxide in 1200 parts of isopropyl alcohol. The reaction temperature may rise to 40° C. The reaction mixture may then be heated to reflux and refluxed for one hour (the temperature may be about 82° C.). Upon cooling, the mixture may separate into two liquid phases and a crystalline solid (sodium sulfate). The liquid phases may be transferred to a separatory funnel and the bottom aqueous phase discarded. The organic phase may then be stripped of solvent leaving 676 parts of a white microcrystalline product. This crude product may be recrystallized from acetone to yield 602 parts of bis(tri-n-butyltin)sulfate in the form of large white crystals. This may represent a yield of 89%. The product may contain 34.7% tin (theory 35.2%) and 4.84% sulfur (theory 4.74%). The melting point may be 148.8° C.–149.5° C.

Example 2.—Bis(tri-n-propyltin)sulfate 102 parts (0.2 mole) of bis(tripropyltin)oxide and 225 parts of toluene may be warmed, with stirring, in a reaction vessel. While heating, a solution of 55 parts of sodium bisulfate monohydrate (0.4 mole) in 100 parts of water may be added to the flask. The reaction mixture may be refluxed for one hour and then filtered hot. The white solids thus recovered may be washed thoroughly with 2,000 parts of hot water containing a small amount of wetting agent, and then with pentane. 106 parts, representing 89% yield, of bis(tri-n-propyltin)sulfate may be thus recovered. The product may be twice recrystallized from isobutyl alcohol to yield a material containing 40.19% tin (theory 40.11%) and 5.42 sulfur (theory 5.42%). The product may melt at 183–186° C.

Example 3.—Bis(triisopropyltin)sulfate

An aqueous solution of 15.6 parts (0.1128 mole) of sodium bisulfate monohydrate in 45 parts of water may be added at 50° C, to a solution of 28.9 parts of bis(triisopropyltin)oxide in 84 ml. of isopropyl alcohol over a 3 minute period. The mixture may be refluxed (82° C) for about an hour. Upon cooling, the reaction mixture may consist of a liquid phase and a white solid product (sodium sulfate). The liquid portion may be separated by filtration and stripped of solvent to yield 35.2 parts of crude bis(triisopropyltin)sulfate. This may represent essentially a stoichiometric yield.

About half of this crude product may be dissolved in an equal weight of hot 1,2-dimethoxyethane. The solution may be cooled and allowed to stand for several days to form crystals. They may be washed repeatedly with hexane and then dried on filter paper. Analysis of this product may show it to contain 39.05% tin (theory 40.11%) and 5.34% sulfur (theory 5.42%).

Example 4.—Bis(tri-n-butyltin)sulfite

Bis(tri-n-butyltin)oxide (59 parts) may be dissolved in 118 parts isopropyl alcohol and then treated with a solution prepared by dissolving 19 parts sodium metabisulfite in 54 parts of water. The reaction mixture may be stirred at 40–50° C. for 1.5 hours. The solid formed in the reaction ($Na_2SO_3$) may be filtered off. The upper phase from the two-phase filtrate may be separated and stripped of solvent under reduced pressure giving 39 parts of a liquid product (Crop I). The remainder of the filtrate may be diluted with enough water to dissolve an additional precipitate of inorganic salts and to make the aqueous layer the top phase. After separation of this aqueous layer, 80 parts of heptane may be added to the bottom organic phase to separate the small amount of residual water. The hydrocarbon phase may be stripped under reduced pressure to yield 17.3 parts of additional product (Crop II).

Both crops of the crude product may be combined and treated with 140 parts of acetone. The top (acetone) layer, containing impurities, may be discarded and the bottom layer stripped under reduced pressure giving 53.5 parts of purified bis(tri-n-butyltin)sulfite (81.5% yield), having an analysis of 35.35% Sn (36.0% theory), 4.95% S (4.85% theory), and an acid number of 169 (170 theory).

Example 5.—Bis(triisopropyltin)sulfite

Bis(triisopropyltin)oxide (41 parts) in 75 parts isopropyl alcohol may be treated with a solution prepared by dissolving 16.7 parts sodium metabisulfite in 32 parts of water. The reaction mixture may be stirred at 60–65° C. for 70 minutes, then treated with 70 parts water and 100 parts hexane. The phases may be separated and the organic phase stripped of solvent, giving 44.3 parts (96% theory) of a crude solid product.

Recrystallization of the crude product from aqueous isopropyl alcohol may give a white powder having analysis of 41.4% Sn (41.25% theory) and 5.1% S (5.55% theory).

Example 6.—Bis(tri-n-propyltin)sulfite

Bis(tri-n-propyltin)oxide (51 parts) in 118 parts isopropyl alcohol may be treated with a solution prepared by dissolving 19.5 parts sodium metabisulfite in 30 parts water at 30–40° C. The resulting slurry of a white solid may be stirred at 40–50° C. for 90 minutes, allowed to cool to ambient temperature, and then filtered by suction. The filter cake ($Na_2SO_3$) may be washed with 40 parts isopropyl alcohol. Filtrate and washings may be stripped of solvent to yield 52 parts of a crude product (viscous oil).

This material may be purified from suspended solids by diluting with 34 parts hexane and filtering. The filtrate stripped of solvent may yield 51 parts of product (88.5% theory) having an analysis of 41.16% Sn (41.25% theory) and 5.56% S (5.57% theory).

Example 7.—Bis(triphenyltin)sulfite

Bis(triphenyltin)oxide (36 parts) may be dissolved in 103 parts of hot isopropyl alcohol. The solution may be treated at 80° C. with a solution prepared by dissolving 10.5 parts of sodium metabisulfite in 20 parts of water, then stirred at 80° C. for 60 minutes and cooled to room temperature. The precipitated solid may be filtered off. Inorganic salts may be extracted from the filter cake with 350 parts of water. 36.5 parts (93.6% theory) of crude bis(triphenyltin)sulfite may be recovered.

This product may be freed from unreacted oxide by extraction of oxide with isopropanol. The purified material may be a white fluffy solid having a melting point of 150–154° C. and an analysis of 30.1% Sn (theory 30.45%) and 3.9% S (theory 4.1%).

Example 8.—Bis(tricyclohexyltin)sulfate

A mixture of 385 parts (1 mole) of tricyclohexyltin hydroxide and 1500 parts of toluene may be stirred and heated in a reaction vessel. When the temperature reaches 80° C. the mixture may become clear. There may then be added, over a 30 minute period, a solution of 138 parts (1 mole) of sodium bisulfate monohydrate in 375 parts of water. The mixture may be refluxed for an hour, and allowed to cool to room temperature, and finally cooled further in a refrigerator. The crystals which form may be filtered off, washed with petroleum ether and dried in circulating air at 50° C. to yield 332 parts (0.4 mole) of crude bis(tricyclohexyltin)sulfate with a melting point of 154–157.5° C. After recrystallization from isopropyl alcohol, the product may give an analysis of 28.62% Sn (theory 28.52%) and 3.77% S (theory 3.85%).

Example 9.—Bis(tricyclohexyltin)sulfite

Bis(tricyclohexyltin)oxide (30 parts) may be dissolved at 55° C. in a mixture of 94 parts isopropyl alcohol and 27 parts tetrahydrofuran. The solution may be treated at 45–55° C. with a solution prepared by dissolving 7.9 parts of sodium metabisulfite in 13 parts of water. After stirring at that temperature for total of 90 minutes, 27 parts of tetrahydrofuran may be added and the reaction mixture may be stirred at 50–55° C. for additional 50 minutes, then allowed to cool to ambient temperature. A white solid may be formed in the reaction and filtered off. Inorganic salts and other impurities may be removed from this product by extracting filter cake with 200 parts water-acetone mixture followed by 50 parts acetone. The crude product obtained by drying the filter cake (26 parts, 90% of theory) may be purified by extracting impurities with 125 parts of warm hexane. White solid product thus obtained may have an analysis of 29.27% Sn (29.10% theory) and 3.96% S (3.93% theory).

Although this invention has been illustrated by reference to specific examples, numerous changes and modifications thereof which clearly fall within the scope of the invention will be apparent to those skilled in the art.

I claim:

1. The process for preparing a product selected from the group consisting of triorganotin sulfates and triorganotin sulfites which comprises reacting in the presence of water a triorganotin oxide with an inorganic metal salt selected from the group consisting of alkali metal hydrogen sulfates and alkali metal hydrogen sulfites thereby forming said product, and recovering said product.

2. The process of claim 1 wherein said water is present in the amount of at least one mole per mole of said inorganic metal salt.

3. The process for preparing a product selected from the group consisting of triorganotin sulfates and triorganotin sulfites which comprises reacting a triorganotin oxide selected from the group consisting of $(R_3Sn)_2O$ and $R_3SnOH$ wherein R is selected from the group consisting of alkyl, aryl and alkenyl; with an aqueous solution of an inorganic metal salt selected from the group consisting of alkali metal hydrogen sulfates and alkali metal hydrogen sulfites thereby forming said product; and recovering said product.

4. The process of claim 3 wherein said aqueous solution contains said inorganic metal salt in the amount of from 10% by weight to saturation.

5. The process of claim 3 wherein R is butyl.

6. The process of claim 3 wherein R is propyl.

7. The process of claim 3 wherein R is phenyl.

8. The process of claim 3 wherein R is cyclohexyl.

9. The process of claim 3 wherein said inorganic metal salt is sodium hydrogen sulfate.

10. The process of claim 3 wherein said inorganic metal salt is sodium hydrogen sulfite.

11. The process for preparing a product selected from the group consisting of triorganotin sulfates and triorganotin sulfites which comprises reacting at 20–100° C. a triorganotin oxide selected from the group consisting of $(R_3Sn)_2O$ and $R_3SnOH$ wherein R is selected from the group consisting of alkyl, aryl and alkenyl; with an aqueous solution containing from 10% by weight to saturation of an inorganic metal salt selected from the group consisting of alkali metal hydrogen sulfates and alkali metal hydrogen sulfites; in the presence of an inert organic solvent for said triorganotin oxide, said inert organic solvent being present in the amount of 10–800 parts by weight per 100 parts by weight of triorganotin oxide, thereby forming said product; and recovering said product.

12. The process of claim 11 wherein said inorganic metal salt is reacted in the amount of about two moles per mole of triorganotin oxide.

13. The process of claim 11 wherein said inert organic solvent is selected from the group consisting of hydrocarbons, alcohols, and ethers.

14. The process of claim 11 wherein R is butyl.
15. The process of claim 11 wherein R is propyl.
16. The process of claim 11 wherein R is phenyl.
17. The process of claim 11 wherein R is cyclohexyl.
18. The process of claim 11 wherein said inorganic metal salt is sodium hydrogen sulfate.
19. The process of claim 11 wherein said inorganic metal salt is sodium hydrogen sulfite.

References Cited

UNITED STATES PATENTS 3,311,647  3/1967  Stamm _____ 260—429.7

FOREIGN PATENTS 6,765  5/1963  Japan.

TOBIAS E. LEVOW, *Primary Examiner.*

W. F. W. BELLAMY, *Assistant Examiner.*